United States Patent
Kurniawan et al.

(10) Patent No.: US 10,319,210 B2
(45) Date of Patent: Jun. 11, 2019

(54) TRANSLATING BUILDING AUTOMATION EVENTS INTO MOBILE NOTIFICATIONS

(71) Applicant: Honeywell International Inc., Morris Plains, NJ (US)

(72) Inventors: Andie Kurniawan, Mascot (AU); Gary Fuller, North Parramatta (AU); Dae-Soon Kwon, North Ryde (AU); Martin Lee, Lane Cove (AU); Paul Vanderstraeten, North Ryde (AU); Yi-Chang Hsieh, Cammeray (AU)

(73) Assignee: Honeywell International Inc., Morris Plains, NJ (US)

( * ) Notice: Subject to any disclaimer, the term of this patent is extended or adjusted under 35 U.S.C. 154(b) by 16 days.

(21) Appl. No.: 15/168,688

(22) Filed: May 31, 2016

(65) Prior Publication Data
US 2017/0345277 A1 Nov. 30, 2017

(51) Int. Cl.
*G08B 3/00* (2006.01)
*G08B 21/18* (2006.01)
*H04L 12/28* (2006.01)

(52) U.S. Cl.
CPC .......... *G08B 21/18* (2013.01); *H04L 12/2803* (2013.01)

(58) Field of Classification Search
CPC ...... G05B 15/02; G05B 19/042; G08B 21/18; H04L 12/2803; H04W 68/00; H04W 4/008; H04W 4/14; H04M 1/72533
See application file for complete search history.

(56) References Cited

U.S. PATENT DOCUMENTS

| | | | |
|---|---|---|---|
| 9,035,763 B2* | 5/2015 | Poder | G08B 25/001 340/539.13 |
| 9,159,217 B1* | 10/2015 | Logan | G05B 19/042 |
| 9,888,452 B2* | 2/2018 | Logan | H04W 68/00 |
| 2005/0200474 A1* | 9/2005 | Behnke | G08B 25/14 340/521 |
| 2005/0216281 A1 | 9/2005 | Prior | |
| 2007/0233323 A1* | 10/2007 | Wiemeyer | G05B 15/02 700/276 |
| 2009/0051507 A1* | 2/2009 | Outlaw | G06F 11/0748 340/384.1 |
| 2010/0153511 A1* | 6/2010 | Lin | H04L 51/12 709/207 |

(Continued)

FOREIGN PATENT DOCUMENTS

WO 2008150815 A2 12/2008
WO WO 2008150815 A2 * 12/2008 ......... H04L 12/2825

OTHER PUBLICATIONS

International Search Report and Written Opinion from related PCT Application No. PCT/US2017/034277, dated Aug. 24, 2017, 11 pages.

*Primary Examiner* — An T Nguyen
(74) *Attorney, Agent, or Firm* — Seager, Tufte & Wickhem LLP

(57) ABSTRACT

Devices, methods, and systems for translating building automation events into mobile notifications are described herein. One device includes a memory, and a processor configured to execute executable instructions stored in the memory to receive a notification of an event from a building automation system, translate the event into a mobile notification of the event, and transmit the mobile notification of the event to a mobile device.

18 Claims, 3 Drawing Sheets

(56) References Cited

U.S. PATENT DOCUMENTS

| | | | |
|---|---|---|---|
| 2013/0249688 A1* | 9/2013 | Nguyen | G08B 25/08 340/539.13 |
| 2014/0266699 A1* | 9/2014 | Poder | G08B 25/001 340/539.13 |
| 2014/0277753 A1* | 9/2014 | Eiynk | G05B 15/02 700/275 |
| 2015/0105880 A1 | 4/2015 | Slupik et al. | |
| 2015/0269841 A1* | 9/2015 | Makowitz | G08G 1/096791 348/149 |
| 2015/0281928 A1* | 10/2015 | Auen | H04W 4/90 455/404.2 |
| 2016/0234245 A1* | 8/2016 | Chapman | G06F 21/6245 |
| 2016/0337166 A1* | 11/2016 | Duca | H04L 41/069 |
| 2017/0076562 A1* | 3/2017 | Hicks, III | G08B 7/06 |
| 2017/0105190 A1* | 4/2017 | Logan | H04W 68/00 |
| 2017/0163752 A1* | 6/2017 | Kaledhonkar | H04L 67/26 |
| 2017/0345277 A1* | 11/2017 | Kurniawan | H04L 12/2803 |

\* cited by examiner

TRANSLATING BUILDING AUTOMATION EVENTS INTO MOBILE NOTIFICATIONS

TECHNICAL FIELD

The present disclosure relates to devices, methods, and systems for translating building automation events into mobile notifications.

BACKGROUND

Building automation systems can be complex distributed systems used to automate monitoring and control of a facility (e.g., building). For example, a building automation system can include many different pieces of equipment, components, and/or devices. As an example, a building automation system can include different pieces of heating, ventilation, and air-conditioning (HVAC) equipment, as well as other equipment such as sensors, operating panels, controllers, actuators, etc.

A user, such as, for instance, an operator or facility manager, may routinely interact with a building automation system of a facility to monitor and control the facility. For example, the user may review notifications of events from the building automation system, such as, for instance, alarms or warnings, and may make adjustments to control components or other operations of the building automation systems (e.g., in response to the notifications).

Such interactions may occur (e.g., be conducted), for example, in a control room of the building automation system or facility. However, in previous approaches, the user may be limited to certain locations, such as the control room or other location in the building automation system and/or facility, at which he or she can conduct such interactions.

DETAILED DESCRIPTION

Figure 1:
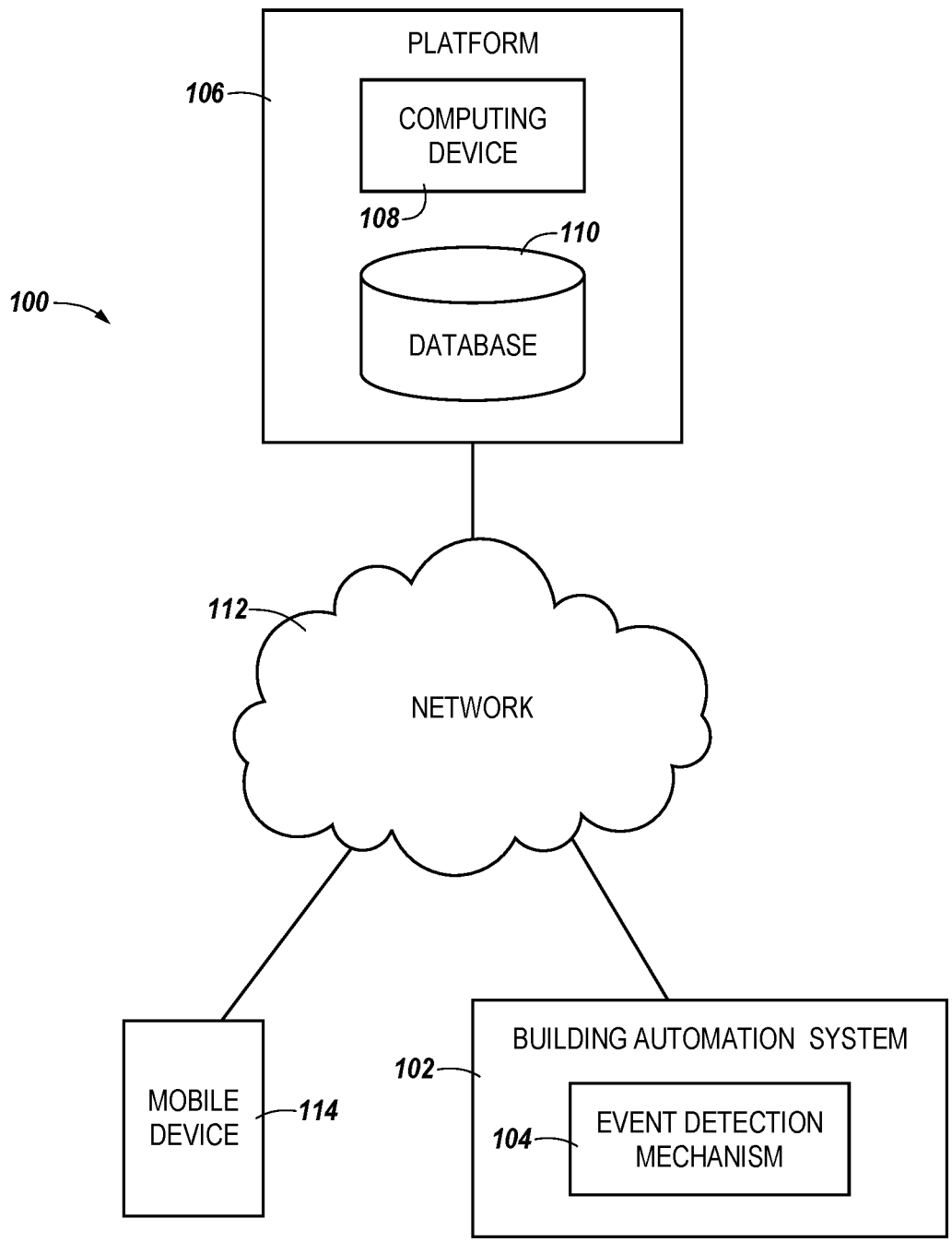
FIG. 1 illustrates a system for translating building automation events into mobile notifications in accordance with one or more embodiments of the present disclosure.

Devices, methods, and systems for translating building automation events into mobile notifications are described herein. For example, one or more embodiments include a memory, and a processor configured to execute executable instructions stored in the memory to receive a notification of an event from a building automation system, translate the event into a mobile notification of the event, and transmit the mobile notification of the event to a mobile device.

Embodiments of the present disclosure can allow a user, such as, for instance, an operator or facility manager, to interact with a building automation system of a facility to monitor and/or control the facility even if the user is remote to (e.g., located remotely from) the building automation system or facility. For example, embodiments of the present disclosure can allow the user to maintain awareness of events occurring in the building automation system or facility even if the user is outside of the control room or other typical work location of the building automation system or facility.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 308 in FIG. 3A.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of mobile devices" can refer to one or more mobile devices.

FIG. 1 illustrates a system 100 for translating building automation events into mobile notifications in accordance with one or more embodiments of the present disclosure. As shown in FIG. 1, system 100 can include a building automation system 102, and a platform 106 remote to (e.g., located remotely from) building automation system 102. For example, platform 106 can be a network-based (e.g., a cloud-based) platform. As shown in FIG. 1, platform 106 can include computing device 108 and database 110, which will be further described herein.

As used herein, a "building automation system" (e.g., building automation system 102) can refer to any type of system that can be used to automate the monitoring and/or control of a facility or building. For example, a building automation system can be used to check and/or set the state of control components, equipment, devices, networks, areas, and/or spaces of the facility or building. As an additional example, a building automation system can be used to manage alarms and/or incidents, such as, for instance, security incidents, that may occur at the facility or building. Further, a building automation system may be a complex distributed system that includes many different pieces of equipment, components, and/or devices. As an example, a building automation system can include different pieces of heating, ventilation, and air-conditioning (HVAC) equipment, as well as other equipment such as sensors, operating panels, controllers, actuators, etc.

Building automation system 102 can detect events occurring in building automation system 102, which can correspond to incidents occurring at the building or facility being managed by building automation system 102. For example, an alarm or warning occurring in and detected by building automation system 102 can provide an indication (e.g., an alarm or warning) of an incident occurring at the building or facility. That is, the event can be an alarm or warning indicating that an incident, such as, for instance, a fire or security breach, is occurring at the building or facility. As an additional example, the event can be and/or include a discussion (e.g., chat) between operators and/or facility managers about an incident occurring at the building or facility. However, embodiments of the present disclosure are not limited to a particular type of event or events that can be detected by building automation system 102.

As shown in FIG. 1, building automation system 102 can include an event detection mechanism 104 for detecting events occurring in building automation system 102. For example, event detection mechanism 104 can be an alarm system that can detect alarms, such as fire and/or security alarms, occurring in building automation system 102.

Further, building automation system 102 (e.g., event detection mechanism 104) can detect events based on information (e.g., data) received by building automation system 100. For instance, building automation system 102 can detect events based on information received from alarms, sensors, controllers, or other equipment, components, and/or devices of building automation system 102.

Upon detecting an event, building automation system 102 can transmit (e.g., send) a notification of the event to platform 106. That is, platform 106 can receive a notification of the event from building automation system 102. For instance, the notification can be received by computing device 108 of platform 106.

Platform 106 (e.g., computing device 108) can receive the notification of the event from building automation system 102 via network 112, as illustrated in FIG. 1. Network 112 can be a network relationship through which controller platform 106 (e.g., computing device 108) and building automation system 102 and mobile device 114 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, network 112 can include a number of servers that receive the notification of the event from building automation system 102 via a wired or wireless network, and transmit the received notification to platform 106 via a wired or wireless network.

As used herein, a "network" (e.g., network 112) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Upon receiving the notification of the event, platform 106 (e.g., computing device 108) can translate the event into a mobile notification of the event. The mobile notification can be, for example, a push notification having a common data format. That is, translating the event into the mobile notification can include translating the event into a push notification having a common data format. As used herein, a common data format refers to a self-describing data format for the storage and manipulation of data in a platform and discipline independent manner.

Further, translating the event into the mobile notification of the event can include mapping the event to a message template for that type of event (e.g., an alarm event is mapped to an alarm message template, a warning event is mapped to a warning message template, etc.), and adding information (e.g., data and/or details) about that event to the message template. That is, the mobile notification can comprise the message template for that event with additional information about the event added in.

The additional information about the event may be included in, and taken from, the notification of the event received from building automation system 102. Further, different message templates for different event types can be stored in database 110. Upon receiving the notification of the event, computing device 108 can determine the type of event in the notification (e.g., based on the information in the notification), and retrieve the message template for that event type from database 110. The event itself may also be stored in database 110, for use in generating mobile notifications of subsequent events.

Upon translating the event into the mobile notification, platform 106 (e.g., computing device 108) can transmit the mobile notification of the event to a mobile device, such as mobile device 114 illustrated in FIG. 1. Mobile device 114 can be, for example, the mobile device of an operator or facility manager of building automation system 102.

Mobile device 114 can be, for example, a smart phone, a tablet, or a PDA, among other types of mobile devices. In some embodiments, mobile device 114 can be a wearable device, such as, for instance, a smart watch. Mobile device 114 will be further described herein (e.g., in connection with FIG. 3B).

Platform 106 can transmit the mobile notification to mobile device 114, for example, via network (e.g., cloud computing environment) 112. As such, mobile device 114 can be remote to platform 106 and building automation system 102. Accordingly, the user of mobile device 114 (e.g., the operator or facility manager) can receive the notification of the event even if the user is remote to building automation system 102. For instance, the user of mobile device 114 can receive the notification of the event even if the user is outside of the control room or other typical work location of building automation system 102.

In some embodiments, platform 106 (e.g., computing device 108) may only transmit the mobile notification of the event to mobile device 114 if platform 106 has previously received a valid registration from mobile device 114 indicating the user of mobile device 114 is a registered user of building automation system 102. Further, platform 106 may only transmit the mobile notification of the event to mobile device 114 if platform 106 has previously received an opt in from mobile device 114 indicating the user of the mobile device would like to receive notifications of events from building automation system 102.

Although the example illustrated in FIG. 1 includes one building automation system and one mobile device, embodiments of the present disclosure are not so limited, and can include any number of building automation systems and mobile devices. For example, platform 106 (e.g., computing device 108) can receive notifications of events from a number of additional building automation systems, store the events in database 110, and translate the events into mobile notifications of those events in a manner analogous to that previously described herein for events detected by and transmitted from building automation system 102. Further, platform 106 (e.g., computing device 108) can transmit these mobile notifications, as well as the mobile notifications of events received from building automation system 102, to any number of mobile devices, including and/or in addition to mobile device 114, in a manner analogous to that previously described herein.

Figure 2:
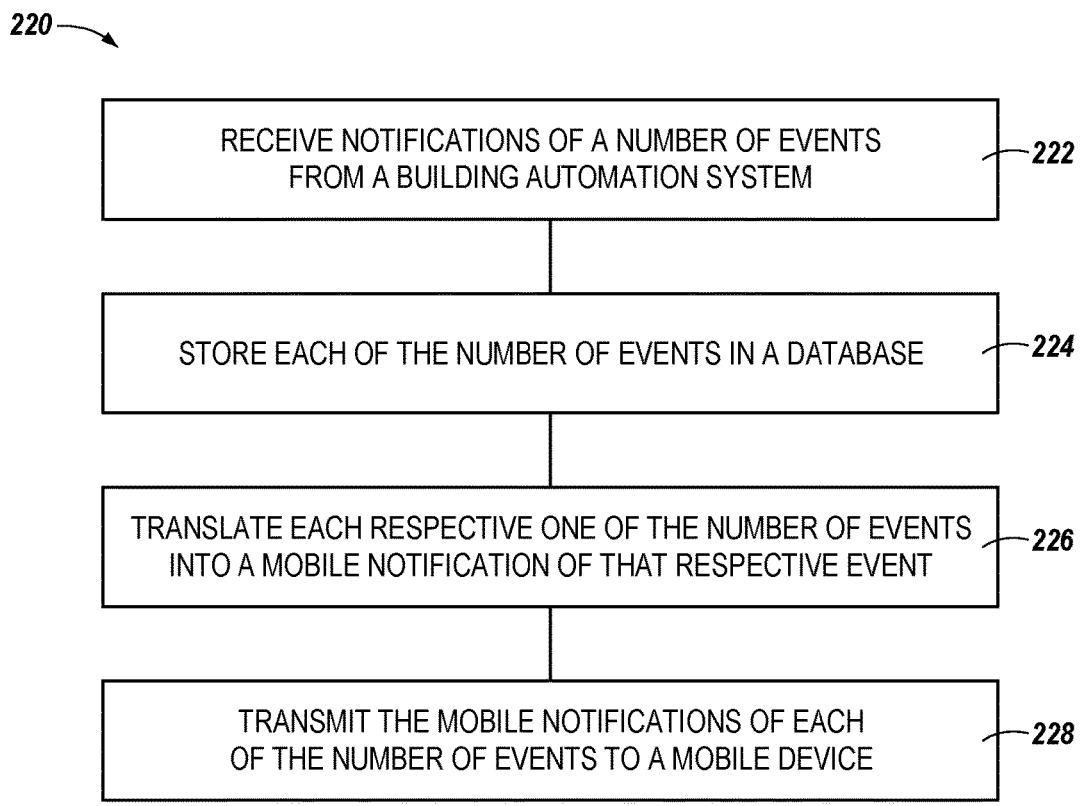
FIG. 2 illustrates a method for translating building automation events into mobile notifications in accordance with one or more embodiments of the present disclosure.

FIG. 2 illustrates a method 220 for translating building automation events into mobile notifications in accordance with one or more embodiments of the present disclosure. Method 220 can be performed, for example, by platform 106 previously described in connection with FIG. 1. For instance, method 220 can be performed by computing device 108 of platform 106.

At block 222, method 220 includes receiving notifications of a number of events from a building automation system. The building automation system can be, for example, building automation system 102 previously described in connection with FIG. 1, and the events can be detected by the building automation system as previously described herein (e.g., in connection with FIG. 1). Further, the notifications can be received via a network (e.g., a cloud computing environment), such as, for instance, network 112 previously described in connection with FIG. 1.

At block 224, method 220 includes storing each of the number of events in a database. The database can be, for example, database 110 previously described in connection with FIG. 1.

At block 226, method 220 includes translating each respective one of the number of events into a mobile notification of that respective events. The mobile notifications can be, for example, push notifications having a common data format, as previously described herein (e.g., in connection with FIG. 1), and each respective event can be translated into a mobile notification in a manner analogous to that previously described herein (e.g., in connection with FIG. 1).

At block 228, method 220 includes transmitting the mobile notifications of each of the number of events to a mobile device. The mobile device can be, for example, mobile device 114 previously described in connection with FIG. 1, and the mobile notifications can be transmitted to the mobile device via network 112 in a manner analogous to that previously described in connection with FIG. 1.

Figure 3A:
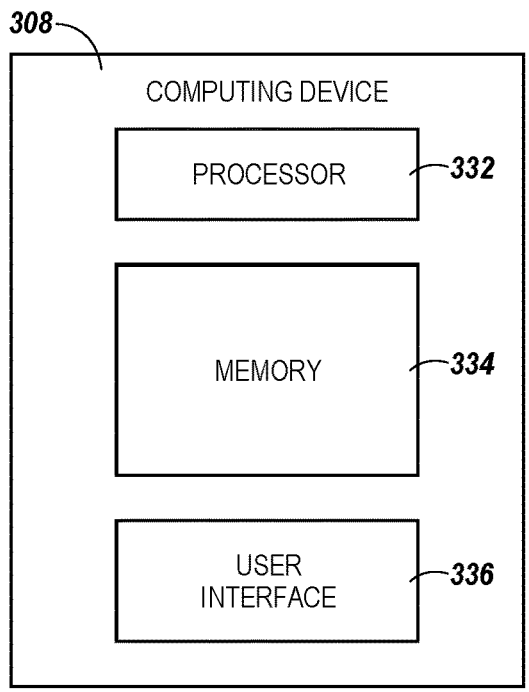
FIG. 3A illustrates a computing device for translating building automation events into mobile notifications in accordance with one or more embodiments of the present disclosure.
Figure 3B:
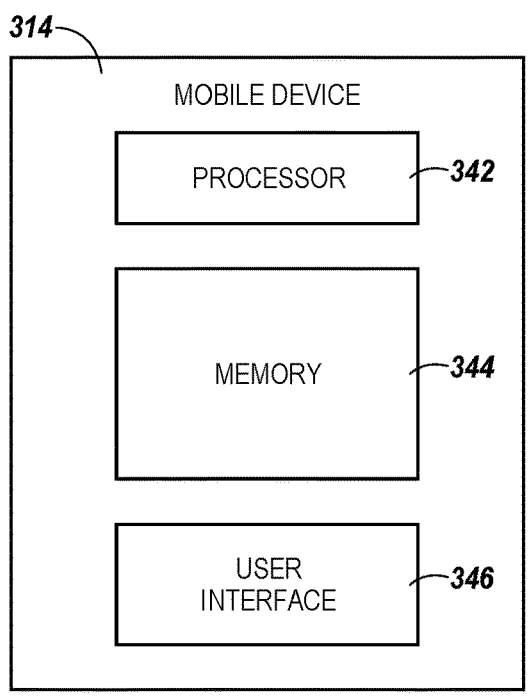
FIG. 3B illustrates a mobile device for translating building automation events into mobile notifications in accordance with one or more embodiments of the present disclosure.

FIG. 3A illustrates a computing device 308 for translating building automation events into mobile notifications in accordance with one or more embodiments of the present disclosure, and FIG. 3B illustrates a mobile device 314 for translating building automation events into mobile notifications in accordance with one or more embodiments of the present disclosure. Computing device 308 and mobile device 314 can be, for example, computing device 108 and mobile device 114, respectively, previously described in connection with FIG. 1.

As shown in FIGS. 3A and 3B, computing device 308 can include a memory 334 and a processor 332, and mobile device 314 can include a memory 344 and a processor 342. Memories 334 and 344 can be any type of storage medium that can be accessed by processors 332 and 342, respectively, to perform various examples of the present disclosure. For example, memory 334 can be a non-transitory computer readable medium having computer readable instructions (e.g., computer program instructions) stored thereon that are executable by processor 332 to translate building automation events into mobile notifications in accordance with the present disclosure. That is, processor 332 can execute the executable instructions stored in memory 334 to translate building automation events into mobile notifications in accordance with the present disclosure.

Memories 334 and 344 can be volatile or nonvolatile memory. Memories 334 and 344 can also be removable (e.g., portable) memory, or non-removable (e.g., internal) memory. For example, memories 334 and 344 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memories 334 and 344 are illustrated as being located in computing device 308 and mobile device 314, respectively, embodiments of the present disclosure are not so limited. For example, memories 334 and/or 344 can also be located internal to another computing resource (e.g., enabling computer readable instructions to be downloaded over the Internet or another wired or wireless connection).

As shown in FIGS. 3A and 3B, computing device 308 can include a user interface 336, and mobile device 314 can include a user interface 346. A user (e.g., operator or facility manager) of computing device 308 can interact with computing device 308 via user interface 336, and a user of mobile device 314 can interact with mobile device 314 via user interface 346. For example, user interface 346 can provide (e.g., display and/or present) information to the user of mobile device 314, such as, for instance, a mobile notification of an event from a building automation system in accordance with the present disclosure. Further, user interface 346 can receive information from (e.g., input by) the user of mobile device 314.

In some embodiments, user interfaces 336 and/or 346 can be graphical user interfaces (GUIs) that can include a display (e.g., a screen) that can provide and/or receive information to and/or from the user of computing device 308 and mobile device 314, respectively. The display can be, for instance, a touch-screen (e.g., the GUI can include touch-screen capabilities). As an additional example, user interface 336 can include a keyboard and/or mouse the user can use to input information into computing device 308. Embodiments of the present disclosure, however, are not limited to a particular type(s) of user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for translating a building automation event into a mobile notification, comprising:
   a memory; and
   a processor configured to execute executable instructions stored in the memory to:
      receive a notification of an event from a building automation system;
      translate the event into a mobile notification of the event by:
         retrieving a message template for that event type from a database that stores different message templates for different event types;
         mapping the event to the message template for that event type retrieved from the database; and
         adding information about the event to the message template for that event type, such that the mobile notification of the event comprises the message template for that event type with the information about the event added in, wherein the information about the event added to the message template is included in and taken from the notification of the event, and includes data or details about the event to be provided to each respective user of a plurality of mobile devices; and
      concurrently transmit the mobile notification of the event to each of the plurality of mobile devices.

2. The computing device of claim 1, wherein the event is an alarm.

3. The computing device of claim 1, wherein the mobile notification is a push notification having a common data format.

4. The computing device of claim 1, wherein the processor is configured to execute the instructions to:
   receive the notification of the event from the building automation system via a network; and
   transmit the mobile notification of the event to each of the plurality of mobile devices via the network.

5. The computing device of claim 4, wherein the network is a cloud computing environment.

6. The computing device of claim 1, wherein at least one of the plurality of mobile devices is a smart phone.

7. The computing device of claim 1, wherein the processor is configured to execute the instructions to transmit the mobile notification of the event to each of the plurality of mobile devices only if the computing device has received an opt in from each of the plurality of mobile devices to receive notifications of events from the building automation system.

8. The computing device of claim 1, wherein the event is a warning.

9. A method for translating a building automation event into a mobile notification, comprising:
   receiving, by a computing device, notifications of a number of events from a building automation system;
   storing each of the number of events in a database that also stores different message templates for different event types;
   translating, by the computing device, each respective one of the number of events into a mobile notification of that respective event by:
      retrieving a message template for that event type from the database;
      mapping that event to the message template for that event type retrieved from the database; and
      adding information about that event to the message template for that event type, such that the mobile notification of that event comprises the message template for that event type with the information about that event added in, wherein the information about that event added to the message template is included in and taken from the notification of that event, and includes data or details about that event to be provided to each respective user of a plurality of mobile devices; and
   concurrently transmitting, by the computing device, the mobile notifications of each of the number of events to each of the plurality of mobile devices.

10. The method of claim 9, wherein translating each respective one of the number of events into the mobile notification of that respective event includes translating each respective event into a common data format.

11. The method of claim 9, wherein the method includes:
   receiving, by the computing device, notifications of a number of events from an additional building automation system;
   storing each of the number of events from the additional building automation system in the database;
   translating, by the computing device, each respective one of the number of events from the additional building automation system into a mobile notification of that respective event; and
   concurrently transmitting, by the computing device, the mobile notifications of each of the number of events from the additional building automation system to each of the plurality of mobile devices.

12. A system for translating a building automation event into a mobile notification, comprising:
   a building automation system; and
   a network-based platform remote to the building automation system;
   wherein the building automation system is configured to:
      detect an event occurring in the building automation system; and
      transmit a notification of the event to the network-based platform; and
   wherein the network-based platform is configured to:
      translate the event into a mobile notification of the event by:
         retrieving a message template for that event type from a database that stores different message templates for different event types;
         mapping the event to the message template for that event type retrieved from the database; and
         adding information about the event to the message template for that event type, such that the mobile notification of the event comprises the message template for that event type with the information about the event added in, wherein the information about the event added to the message template is included in and taken from the notification of the event, and includes data or details about the event to be provided to each respective user of a plurality of mobile devices; and concurrently transmit the mobile notification of the event to each of the plurality of mobile devices.

13. The system of claim 12, wherein the network-based platform is configured to store the event in the database.

14. The system of claim 12, wherein the building automation system is configured to detect the event based on information received by the building automation system.

15. The system of claim 12, wherein the building automation system includes an event detection mechanism configured to detect the event.

16. The system of claim 15, wherein the event detection mechanism is an alarm system.

17. The system of claim 12, wherein the network-based platform is a cloud-based platform.

18. The system of claim 12, wherein the building automation system is remote to each of the plurality of mobile devices.

\* \* \* \* \*